United States Patent [19]

Lew

[11] Patent Number: 5,237,877
[45] Date of Patent: * Aug. 24, 1993

[54] VORTEX FLOWMETER WITH NOISE REJECTING SENSOR

[76] Inventor: Hyok S. Lew, 7890 Oak St., Arvada, Colo. 80005

[*] Notice: The portion of the term of this patent subsequent to Jan. 22, 2008 has been disclaimed.

[21] Appl. No.: 756,881

[22] Filed: Sep. 9, 1991

Related U.S. Application Data

[63] Continuation-in-part of Ser. No. 584,105, Sep. 19, 1990, Pat. No. 5,109,704.

[51] Int. Cl.⁵ .............................................. G01F 1/32
[52] U.S. Cl. .................................................. 73/861.24
[58] Field of Search ........... 73/861.02, 861.03, 861.22, 73/861.24

[56] References Cited

U.S. PATENT DOCUMENTS

| | | | |
|---|---|---|---|
| 4,986,134 | 1/1991 | Lew | 73/861.24 |
| 5,090,251 | 2/1992 | Lew | 73/861.24 |

Primary Examiner—Michael T. Razavi
Assistant Examiner—R. L. Biegel

[57] ABSTRACT

A vortex flowmeter comprises a vortex generating bluff body and a planar vortex sensor with leading edges of first and second halves thereof offset from one another by a distance equal to half wave length of sinuating streamlines created by vortices shed from the bluff body, wherein the planar vortex sensor is supported at the midsection thereof by a support member extending from the flowmeter body, and one extremity thereof is connected to a transducer while the other extremity is connected to the flowmeter body in an arrangement providing generally identical flexural vibration characteristics for the first and second halves of the planar vortex sensor.

20 Claims, 3 Drawing Sheets

VORTEX FLOWMETER WITH NOISE REJECTING SENSOR

This patent application is a Continuation-In-Part to U.S. patent application Ser. No. 584,105 entitled "Vortex Flowmeter with Balanced Vortex Sensor" filed on Sep. 19, 1990 now U.S. Pat. No. 5,109,704 and, consequently, the priority on inventions described and claimed in the present patent application is based on the aforementioned parent application.

BACKGROUND OF THE INVENTION

The vortex flowmeter has an inherent advantage over all of the existing volumetric flowmeters, as it employs no moving parts and is capable of operating even under very low temperature as well as at a very high temperature. It is also a well observed fact that a well designed vortex flowmeter has a turn-down ratio (ratio of the maximum measurable velocity to the minimum measurable velocity) approaching or exceeding one hundred to one as the vortex flowmeter measures air flow as low as 1 meter per second and as high as 150 meters per second, and water flow as low as 0.1 meter per second and as high as 15 meters per second in laboratory flow testing. This extraordinary capability of the vortex flowmeter demonstrated in laboratory testing can be realized in industrial flow measurements only if the vortex sensor employed in the vortex flowmeter has a theoretically perfect and practically simple means for rejecting the noise generated by the structural vibrations of the pipe line structure and by the irregular flow patterns involved in the sinuating stream lines associated with the vortices shed from the vortex generator.

BRIEF SUMMARY OF THE INVENTION

The primary object of the present invention is to provide a vortex sensor of planar geometry disposed down stream of and parallel to the vortex generating bluff body, that has leading edges of the two halves thereof offset from one another by a half wave length of the sinuating streamlines created by the vortices shed from the vortex generating bluff body, which planar vortex sensor with the offset leading edge is supported at the midsection, where the leading edge thereof is stepped, by a support structure extending from the wall of the flow passage, wherein a deflective portion of the first half of the planar vortex sensor is connected to a transducer converting oscillating fluid dynamic torque about an axis parallel to the central axis of the flow passage experienced by the planar vortex sensor to an alternating electrical signal, and a deflective portion of the second half of the planar vortex sensor is connected to the wall of the flow passage in such a way that the dynamic characteristics of the first and second halves of the planar vortex sensor are generally matched to one another.

Another object is to provide the planar vortex sensor described in the primary object of the present invention wherein the deflective portion of the second half of the planar sensor is connected to another transducer in place of the connection thereof to the wall of the flow passage, whereby the two electrical signals respectively generated by the two transducers are combined in such a way that noise is cancelled therebetween and a refined signal representing the vortex shedding from the vortex generating bluff body is obtained.

These and other objects of the present invention will become clear as the description thereof progresses.

BRIEF DESCRIPTION OF THE FIGURES

The present invention may be described with a greater clarity and specificity by referring to the following figures.

DESCRIPTION OF THE ILLUSTRATED EMBODIMENTS

Figure 1:
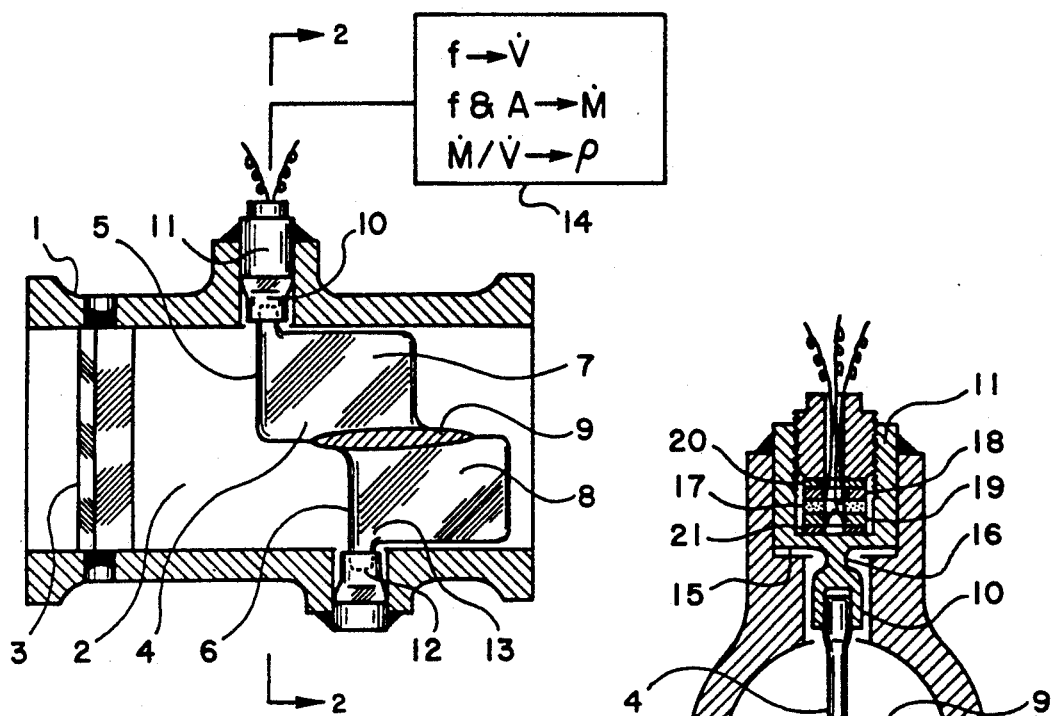
FIG. 1 illustrates a cross section of a vortex flowmeter showing fundamental features of the present invention.

In FIG. 1 there is illustrated a cross section of a vortex flowmeter showing a representative embodiment of the present invention. The vortex flowmeter comprises a body 1 including a flow passage 2 extending therethrough, a vortex generating bluff body 3 of an elongated cylindrical shape disposed across the flow passage and a planar vortex sensing member 4 disposed downstream of the bluff body 3 parallel to the bluff 3 on a plane generally parallel to the central axis of the flow passage 2. The leading edges 5 and 6 of the two halves 7 and 8 of the planar vortex sensing member 4 are offset from one another by a distance equal to a noninteger times the wave length of the sinuating streamlines created by the vortices shed from the two opposite side faces of the bluff body 3 in an alternating manner. It is generally preferred to offset the leading edges 5 and 6 of the planar vortex sensing member 4 by one half of the wave length of the sinuating streamlines, whereby the alternating fluid dynamic forces experienced by the two halves 7 and 8 of the planar vortex sensor 4 is in opposite directions at all instances and, consequently, generates an alternating torque about an axis parallel to the central axis of the flow passage 2 and passing through the midsection of the planar vortex sensing member 4 whereat the leading edge is stepped. The midsection of the planar vortex sensing member 4 is fused to the midsection of a planar support member 9 disposed across the flow passage generally perpendicular to the planar vortex sensing member 4 on a plane parallel to the central axis of the flow passage 2 and secured to the wall of the flow passage at both extremities thereof. The planar support member 9 may have a length less than, equal to, or greater than the length of the planar vortex sensing member 4 measured in a direction parallel to the central axis of the flow passage 2. A deflective portion, preferably the over-hanging extremity, of the first half 7 of the planar vortex sensing member 4 is connected to a force transmitting member 10 extending from an end wall of the cylindrical container vessel 11 housing the transducer assembly, while a deflective portion, preferably the over-hanging extremity, of the second half 8 of the planar vortex sensing member is connected to a holding member 12 affixed to the flowmeter body 1, that simulates the connection of the first half 7 of the vortex sensing planar member 4 to the transducer assembly in such a way that the two halves 7 and 8 of the planar vortex sensing member 4 exhibits generally similar dynamic characteristics in flexural vibration. Of course, the extremity 13 of the second half may be directly anchored to the wall of the flow passage 2 without the holding member 12, which arrangement provides a gain in economics by sacrificing a level of perfection in the performance of the flowmeter. A data processor 14 determines the volume flow rate V or the fluid velocity U from the frequency f of the vortex shedding represented by the frequency of the alternating electrical signal generated by the transducer contained in the transducer container vessel 11, as the fluid velocity U is proportional to the frequency f, and determines the mass flow rate M as a function of the frequency f and the amplitude A of the alternating electrical signal, as the amplitude A representing the amplitude of the fluid dynamic force exerted by the vortices-generated sinuating streamlines and experienced by the planar vortex sensing member 4 is proportional to the dynamic pressure of fluid flow that is equal to one half of the fluid density times the square of the fluid velocity. The data processor 14 can also determine the density $\rho$ of the fluid as a ratio of the mass flow rate to the volume flow rate.

Figure 2:
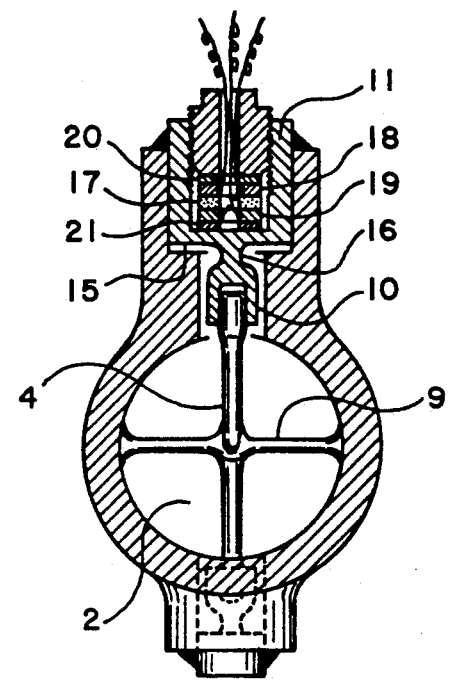
FIG. 2 illustrates another cross section of the vortex flowmeter shown in FIG. 1, which cross section shows an embodiment of the support supporting the planar vortex sensor at a midsection thereof.

In FIG. 2 there is illustrated another cross section of the vortex flowmeter shown in FIG. 1, which cross section taken along plane 2-2 as shown in FIG. 2 clearly illustrates the supporting arrangement of the planar vortex sensing member 4 by the body 1 of the flowmeter, as well as the arrangement coupling the planar vortex sensing member 4 to the transducer assembly comprising the transducer container vessel 11 and the transducer contained therein. The planar support member 9 and the planar vortex sensing member 4 disposed generally perpendicular to one another are fused to one another at the midsections thereof. The two extremities 115 and 116 of the planar support member 9 is secured to the wall of the flow passage 2. The planar support member 9 may be thin enough to provide a flexibility that allows a minute pivotal movement of the planar vortex sensing member 4 about a pivot axis parallel to the central axis of the flow passage 2 and passing through the midsection of the planar vortex sensing member 4, or it may be sufficiently thick to substantially isolate the flexural movement of the two halves of the planar vortex sensing member 4 from one another. The over-hanging extremity of the first half 7 of the planar vortex sensing member 4 is connected to the force transmitting member 10 extending from a relatively thin end wall 15 of the transducer container vessel 11, which relatively thin end wall may include a reinforcing rib 16 disposed on a reference plane generally parallel to the central axis of the flow passage. The connection between the over-hanging extremity of the first half 7 of the planar vortex sensing member 4 and the force transmitting member 10 comprises a plug or ball and socket coupling as shown by the particular illustrative embodiment, or by any other mechanical coupling means such as a slot engaged by the planar extremity of the planar vortex sensing member, threaded fastening, welded connection, etc., which coupling provides an enhanced flexibility thereat. The transducer container vessel 11 contains a piezo electric disc element 17 sandwiched between a pair of electrode discs 18 and 19, and a pair of insulator discs 20 and 21, which assembly of the transducer components is pressed against the relatively thin end wall 15. It should be understood that, although the piezo electric type transducer exhibits the best performance, other types of transducers such as the strain gauge transducer, capacitive transducer, optoelectrical transducer, etc. can be employed in place of the piezo electric type transducer shown and described in the particular illustrative embodiment, as it is well known practice that more than one type of transducer can perform the required duty and the selection of a particular transducer is a matter of design familiar to those skilled in the art.

Figure 3:
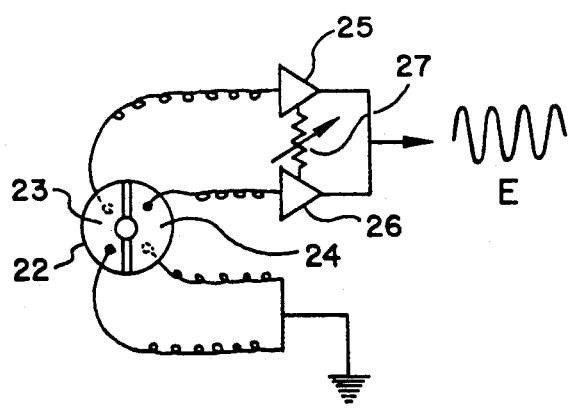
FIG. 3 illustrates an embodiment of the transducer usable in constructing the vortex flowmeter shown in FIGS. 1 and 2.

In FIG. 3 there is illustrated an embodiment of the piezo electric type transducer usable in the construction of the vortex flowmeter shown in FIGS. 1 and 2, and an electric circuit employed to refine the electrical signal generated by the piezo electric type transducer. Each side of the circular piezo electric disc 22 includes two semicircular electrodes 23 and 24 respectively disposed on the two opposite sides of the reference plane including the reinforcing rib 16 included in the embodiment shown in FIG. 2. An electrode disposed on one side of the piezo electric disc and on one side of the reference plane, and another electrode disposed on the other side of the piezo electric disc and the other side of the reference plane are respectively connected to two amplifiers 25 and 26 with a signal balancing means 27 for balancing the level of signal therebetween, while the other electrodes not connected to the amplifier 25 or 26 are grounded. As the two opposite halves of the circular piezo electric disc 22 are respectively compressed and decompressed in a cyclic manner by the alternating fluid dynamic force experienced by the planar vortex sensing member and transmitted to the force transmitting member 10, the alternating fluid dynamic force generates an electromotive force of the same sign from the two electrodes respectively connected to the two amplifiers 25 and 26, while mechanical vibrations in directions parallel to the planar vortex sensing member and perpendicular to the central axis of the flow passage generate an electromotive force of opposite sign from the two electrodes respectively connected to the two amplifiers 25 and 26. Therefore, the two electrical signals respectively supplied to the two amplifiers 25 and 26 can be added in such a way that the noise generated by the mechanical vibrations is cancelled therebetween and a refined signal E representing the fluid dynamic force generated by the vortices shed from the bluff body is obtained, wherein the signal balancing means 27 is adjusted to cancel out the noise. It should be mentioned that the mechanical vibrations in directions parallel to the central axis of the flow passage do not generate any electromotive force.

Figure 4:
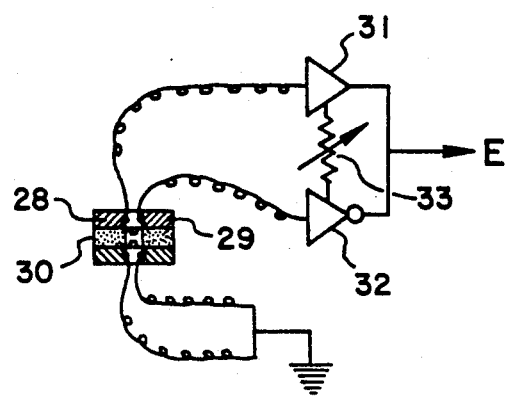
FIG. 4 illustrates another embodiment of the transducer usable in constructing the vortex flowmeter shown in FIGS. 1 and 2.

In FIG. 4 there is illustrated another embodiment of the piezo electric transducer and an electric circuit refining electrical signals generated by the piezo electric transducer. Two electrodes 28 and 29 included on the same side of the circular piezo electric disc 30 are respectively connected to a noninverting amplifier 31 and an inverting amplifier 32, which combination includes a signal balancing means 33 therebetween.

Figure 5:
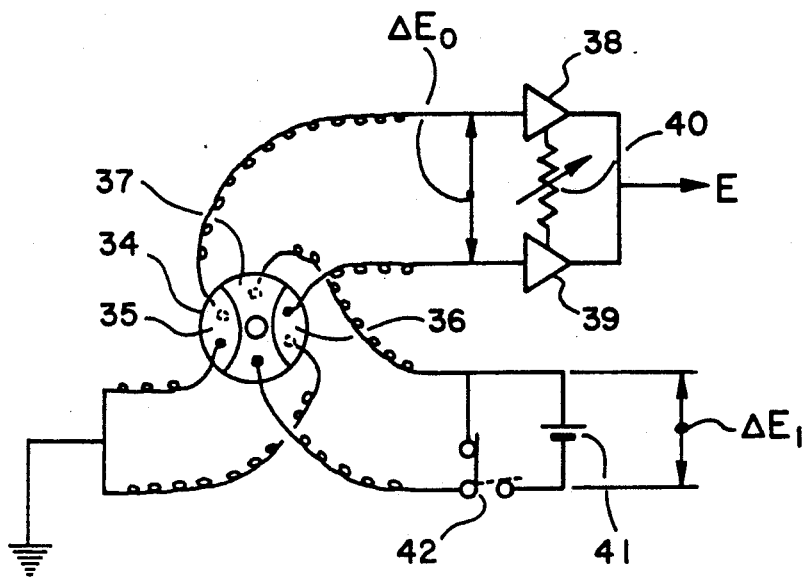
FIG. 5 illustrates a further embodiment of the transducer usable in constructing the vortex flowmeter shown in FIGS. 1 and 2.

In FIG. 5 there is illustrated a further embodiment of the piezo electric transducer, that is a modified version of the embodiment shown in FIG. 3. Each side of the circular piezo electric disc 34 has two side electrodes 35 and 36, and a center electrode 37. The side electrodes are either connected to two amplifiers 38 and 39 with signal balancing means 40 or grounded in the same manner as shown in FIG. 3, while the two center electrodes respectively included in the two opposite sides of the piezo electric disc are connected to the two opposite terminals of a dc electric power source 41 with known supply voltage $\Delta E_I$, that includes a switching means represented by a switch 42 for intermittently supplying an electrical pulse across the two center electrodes, which electrical pulse exerts a mechanical impulse on the piezo electric disc 34 and generates an output electrical pulse $\Delta E_O$ across the two side electrodes respectively connected to the two amplifiers 38 and 39. The ratio between $\Delta E_I$ and $\Delta E_O$ provides a real time calibration factor that converts the amplitude of the electrical signal E when multiplied thereto to the amplitude of the fluid dynamic force generated by the vortices, which real time calibration factor provides accurate values of the amplitude of fluid dynamic force determining the dynamic pressure of the fluid flow independent of the drift in the effectiveness of the piezo electric transducer in converting the alternating fluid dynamic force to the alternating electrical signal. The embodiment of the piezo electric transducer shown in FIG. 3 or 4 may be employed in conjunction with an electromagnet intermittently exerting a mechanical impulse of known magnitude on one half of the planar vortex sensing member in a direction lateral thereto in accomplishing the same end result as that provided by the embodiment of the piezo electric transducer shown in FIG. 5, wherein the ratio between the electric pulse energizing the electromagnet and the electrical pulse generated thereby and measured in a form of the output E provides the calibration factor.

Figure 6:
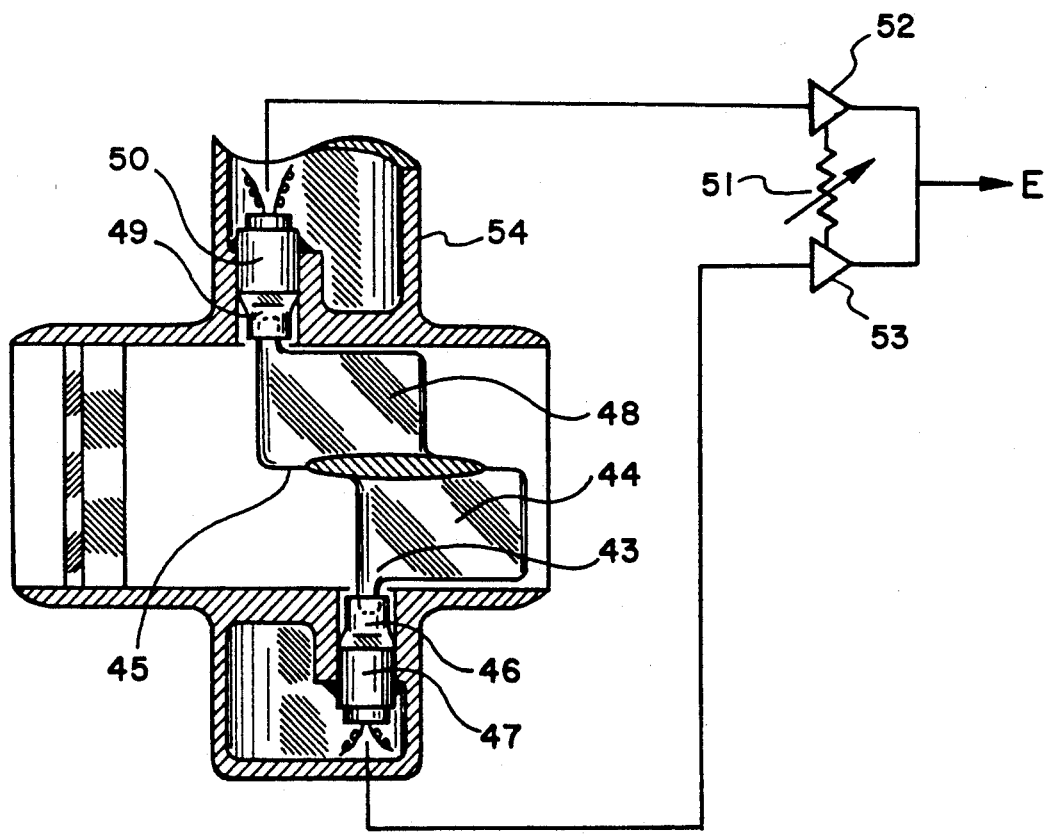
FIG. 6 illustrates a cross section of another vortex flowmeter showing further fundamental features of the present invention.

In FIG. 6 there is illustrated a cross section of another vortex flowmeter showing further fundamental features of the present invention. This embodiment of the vortex flowmeter is a modified version of the embodiment shown in FIG. 1, wherein the extremity 43 of the second half 44 of the planar vortex sensing member 45 is connected to the force transmitting member 46 extending from the relatively thin end wall of another cylindrical transducer container vessel 47, instead of the holding member 12 affixed to the flowmeter body included in the embodiment shown in FIG. 1, which connection between the second half 43 of the planar vortex sensing member 45 and the force transmitting member 46 matches the similar connection between the first half 48 of the planar vortex sensing member 45 and the force transmitting member 49 extending from the relatively thin end wall of the first cylindrical transducer container vessel 50. The two electrical signals respectively generated by the two transducers respectively contained in the two transducer container vessels are combined to cancel out the noise therebetween and obtain a refined signal representing the vortex shedding from the vortex generating bluff body by means of the signal balancing means 51 with or without the pair of amplifiers 52 and 53. This embodiment is particularly suitable to be installed as an insertion type vortex flowmeter that is immersed in a midstream of fluid flow and supported by an elongated support structure 54 laterally extending from the flowmeter body.

Figure 7:
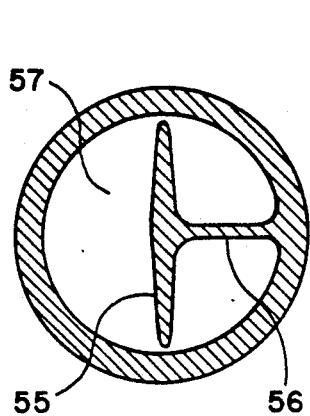
FIG. 7 illustrates another embodiment of the support supporting the planar vortex sensor at a midsection thereof.

In FIG. 7 there is illustrated another embodiment of supporting the planar vortex sensing member 55 with offset leading edge at the midsection thereof, that has a lateral planar extension 56 with the extremity rigidly secured to the wall of the flow passage 57 disposed on a plane parallel to the central axis of the flow passage 57 and extending laterally from the midsection of the vortex sensing planar member 55. This version is the result when one half of the planar support member 9 included in the embodiment shown in FIG. 2 is omitted.

Figure 8:
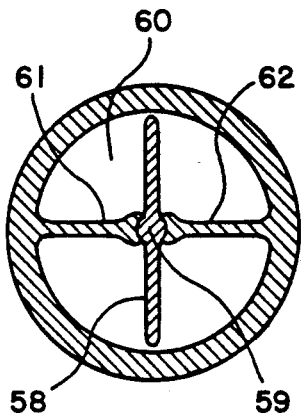
FIG. 8 illustrates a further embodiment of the support supporting the planar vortex sensor at a midsection thereof.

In FIG. 8 there is illustrated a further embodiment of supporting the planar vortex sensing member 58 with offset leading edge at the midsection thereof, that has a rib 59 with circular cross section included in the midsection of the planar vortex sensing member 58 and disposed parallel to the central axis of the flow passage 60, which rib is sandwiched between concave shaped edges of two planar support members 61 and 62 respectively extending from two diametrically opposite portions of the wall of the flow passage 60 and towards one another on a plane generally perpendicular to the planar vortex sensing member 58.

Figure 9:
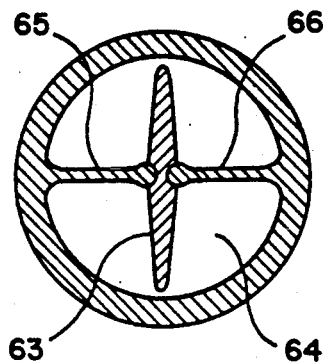
FIG. 9 illustrates yet another embodiment of the support supporting the planar vortex sensor at a midsection thereof.

In FIG. 9 there is illustrated yet another embodiment of supporting the planar vortex sensing member 63 with offset leading edge at the midsection thereof. The two opposite sides of the planar vortex sensing member 63 respectively include two grooves with center planes disposed on a plane parallel to the central axis of the flow passage 64 and dividing the planar vortex sensing member 63 into the first and second halves thereof, which two grooves are respectively engaged by the round edges of two planar support members 65 and 66 respectively extending from two diametrically opposite portions of the wall of the flow passage 64 and towards one another on a plane generally perpendicular to the planar vortex sensing member 63.

Figure 10:
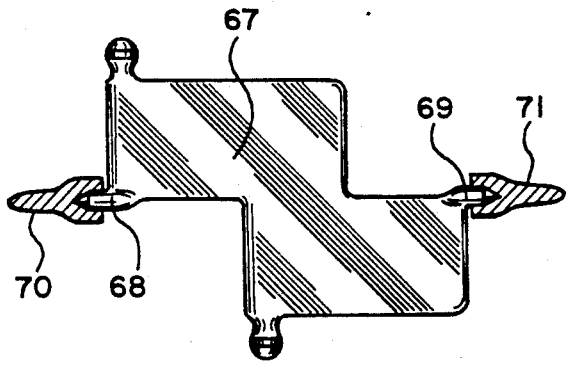
FIG. 10 illustrates yet a further embodiment of supporting the planar vortex sensor at a midsection thereof.

In FIG. 10 there is illustrated yet a further embodiment of supporting the planar vortex sensing member 67 at the midsection thereof, that has a pair of hinge posts 68 and 69 respectively extending from the leading and trailing edges of the planar vortex sensing member 67 in two opposite directions parallel to the central axis of the flow passage, and engaging two hinge holes respectively included in two pylons 70 and 71 disposed across the flow passage and secured to the wall of the flow passage.

Figure 11:
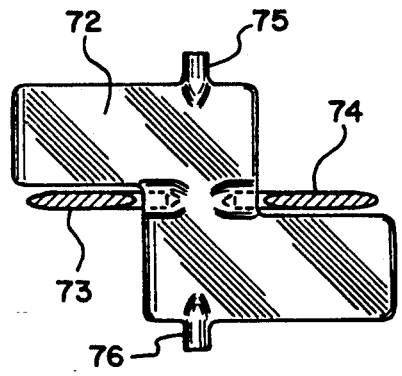
FIG. 11 illustrates still another embodiment of supporting the planar vortex sensor at a midsection thereof.

In FIG. 11 there is illustrated still another embodiment of supporting the planar vortex sensing member 72 at the midsection thereof in an arrangement similar to the embodiment shown in FIG. 10. In this arrangement, two hinge pins respectively extending from two pylons 73 and 74 in two opposite directions parallel to the central axis of the flow passage engage two hinge holes respectively included in the leading and trailing edges of the planar vortex sensing member 72 at the midsection thereof. It should be noticed that the couplings 75 and 76 respectively included in the two opposite extremities of the planar vortex sensing member 72 for connecting to one or more of the force transmitting members extending from the transducer container vessels or to a holding member affixed to the wall of the flow passage are disposed on a line perpendicular to the central axis of the flow passage, which arrangement provides an advantage in the mechanical assembly for constructing an insertion type vortex flowmeter shown in FIG. 6.

While the principles of the invention have now been made clear by the illustrative embodiments, there will be many modifications of the structures, arrangements, proportions, elements, and materials, which are obvious to those skilled in the art and particularly adapted to the specific working environments and operating conditions in the practice of the invention without departing from those principles. It is not desired to limit the invention to the particular illustrated embodiments shown and described and accordingly, all suitable modifications and equivalents may be regarded as falling within the scope of the invention as defined by the claims which follow:

The embodiments of the invention, in which an exclusive property or priviledge is claimed, are defined as follows:

1. An apparatus for measuring flow rate of fluid media comprising in combination:
   a) a body including a flow passage extending therethrough;
   b) a vortex generator of an elongated cylindrical shape disposed across a first cross section of the flow passage;
   c) a vortex sensor of a planar shape disposed across a second cross section of the flow passage substantially parallel to the vortex generator on a plane parallel to the central axis of the flow passage, wherein leading edge of a first half and leading edge of a second half of the vortex sensor respectively located on two opposite sides of a pivot axis parallel to the central axis of the flow passage and located at a midsection of the vortex sensor are offset from one another by a distance equal to a noninteger times wave length of sinuating streamlines created by vortices shed from the vortex generator, and the vortex sensor is fixedly supported at the midsection thereof by at least one support member extending at least partially across the flow passage in an angled relationship to the vortex sensor wherein said support member is fused to the midsection of the vortex sensor and secured to the body at at least one extremity thereof; and
   d) a transducer means with a portion thereof affixed to the body and another portion thereof mechanically connected to a deflective portion of the first half of the vortex sensor for converting alternating fluid dynamic force produced by the vortices and experienced by the vortex sensor to a fluctuating electrical signal representing vortex shedding from the vortex generator.

2. An apparatus as defined claim 1 wherein said combination includes means for determining volume flow rate of fluid media moving through the flow passage as a function of frequency of the fluctuating electrical signal.

3. An apparatus as defined in claim 1 wherein said combination includes means for determining mass flow rate of fluid media moving through the flow passage as a function of frequency and amplitude of the fluctuating electrical signal.

4. An apparatus as defined in claim 1 wherein said combination includes means for determining density of fluid media moving through the flow passage as a ratio of mass flow rate of the fluid media determined as a function of frequency and amplitude of the fluctuating electrical signal to volume flow rate of the fluid media determined as a function of the frequency of the fluctuating electrical signal.

5. An apparatus as defined in claim 1 wherein the distance of offset between the leading edges of the first and second halves of the vortex sensor is approximately equal to half wave length of the sinuating streamlines.

6. An apparatus as defined in claim 1 wherein mass distributions in the first and second halves of the vortex sensor is balanced about said pivot axis located in the midsection of the vortex sensor.

7. An apparatus as defined in claim 1 wherein said combination includes a holder means with a first portion thereof affixed to the body and another portion thereof mechanically connected to a deflective portion of the second half of the vortex sensor.

8. An apparatus as defined in claim 7 wherein said combination includes means for determining volume flow rate of fluid media moving through the flow passage as a function of frequency of the fluctuating electrical signal.

9. An apparatus as defined in claim 7 wherein said combination includes means for determining mass flow rate of fluid media moving through the flow passage as a function of frequency and amplitude of the fluctuating electrical signal.

10. An apparatus as defined in claim 7 wherein said combination includes means for determining density of fluid media moving through the flow passage as a ratio of mass flow rate of the fluid media determined as a function of frequency and amplitude of the fluctuating electrical signal to volume flow rate of the fluid media determined as a function of the frequency of the fluctuating electrical signal.

11. An apparatus as defined in claim 1 wherein said combination includes another transducer means with a portion thereof affixed to the body and another portion thereof mechanically connected to a deflective portion of the second half of the vortex sensor for converting the alternating fluid dynamic force to another fluctuating electrical signal.

12. An apparatus as defined in claim 11 wherein said combination includes an electrical circuit means for combining another fluctuating electrical signals wherein noise created by mechanical vibration of the body is cancelled therebetween and a resultant fluctuating electrical signal representing vortex shedding from the vortex generator is obtained.

13. An apparatus as defined in claim 12 wherein said combination includes means for determining volume flow rate of fluid media moving through the flow passage as a function of frequency of the resultant fluctuating electrical signal.

14. An apparatus as defined in claim 12 wherein said combination includes means for determining mass flow rate of fluid media moving through the flow passage as a function of frequency and amplitude of the resultant fluctuating electrical signal.

15. An apparatus as defined in claim 12 wherein said combination includes means for determining density of fluid media moving through the flow passage as a ratio of mass flow rate of the fluid media determined as a function of frequency and amplitude of the resultant fluctuating electrical signal to volume flow rate of the fluid media determined as a function of the frequency of the resultant fluctuating electrical signal.

16. An apparatus for measuring flow rate of fluid media comprising in combination:
  a) a body including a flow passage extending therethrough;
  b) a vortex generator of an elongated cylindrical shape disposed across a first cross section of the flow passage;
  c) a vortex sensor of a planar shape disposed across a second cross section of the flow passage substantially parallel to the vortex generator on a plane parallel to the central axis of the flow passage, wherein leading edge of a first half and leading edge of a second half of the vortex sensor respectively located on two opposite sides of a pivot axis parallel to the central axis of the flow passage and located at a midsection of the vortex sensor are offset from one another by a distance equal to a noninteger times wave length of sinuating streamlines created by vortices shed from the vortex generator, and the vortex sensor is supported at the midsection thereof by at least one support member extending at least partially across the flow passage in an angled relationship to the vortex sensor and secured to the body at at least one extremity thereof;
  d) a transducer means with a first portion thereof affixed to the body and another portion thereof mechanically connected to a deflective portion of the first half of the vortex sensor for converting alternating fluid dynamic force produced by the vortices and experienced by the vortex sensor to a fluctuating electrical signal representing vortex shedding from the vortex generator; and
  e) a holder means with a first portion thereof affixed to the body and another portion thereof mechanically connected to a deflective portion of the second half of the vortex sensor, holder means free of any transducer means converting the alternating fluid dynamic force to a fluctuating electrical signal, wherein said transducer means and said holder means respectively support the first and second halves of the vortex sensor in a symmetric relationship about said pivot axis.

17. An apparatus as defined in claim 16 wherein said combination includes means for determining volume flow rate of fluid media moving through the flow passage as a function of frequency of the fluctuating electrical signal.

18. An apparatus as defined in claim 16 wherein said combination includes means for determining mass flow rate of fluid media moving through the flow passage as a function of frequency and amplitude of the fluctuating electrical signal.

19. An apparatus as defined in claim 16 wherein said combination includes means for determining density of fluid media moving through the flow passage as a ratio of mass flow rate of the fluid media determined as a function of frequency and amplitude of the fluctuating electrical signal to volume flow rate of the fluid media determined as a function of the frequency of the fluctuating electrical signal.

20. An apparatus as defined in claim 16 wherein the offset distance between the leading edges of the first and second halves of the vortex sensor is approximately equal to half wave length of the sinuating streamlines.

* * * * *